Nov. 1, 1932.  L. LEMERT  1,885,117
REVOLVING PLANT RACK
Filed Oct. 23, 1931  3 Sheets-Sheet 3
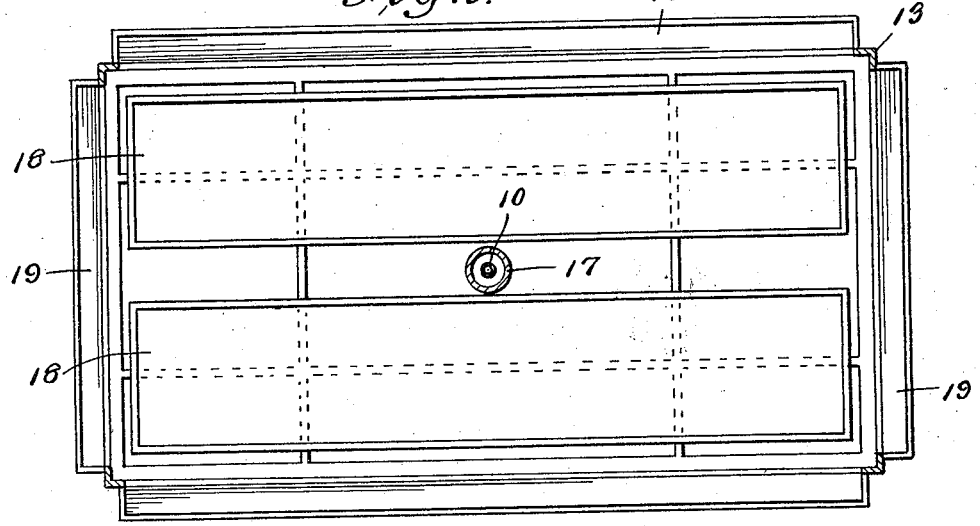
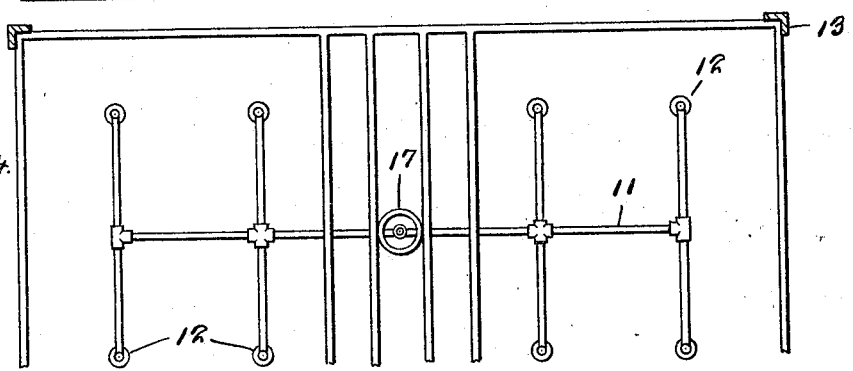
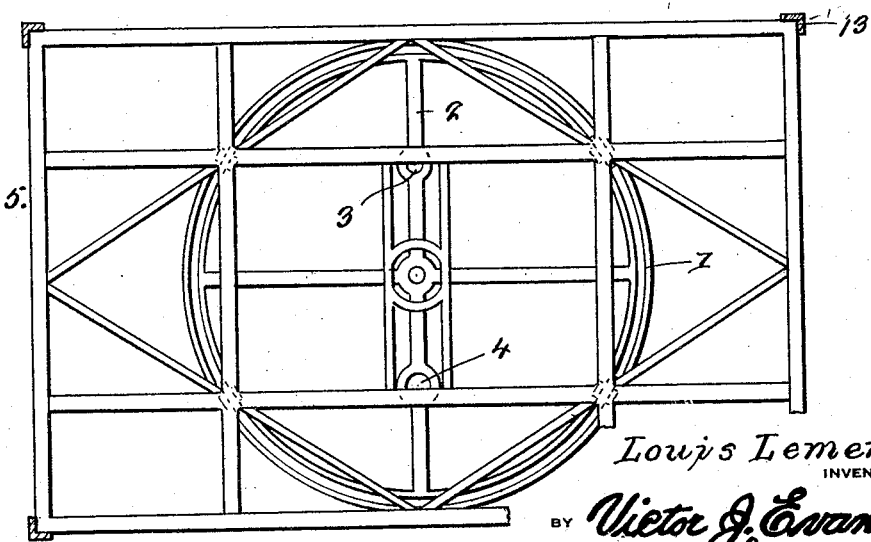
Louis Lemert
INVENTOR
BY Victor J. Evans and Co.
ATTORNEY Patented Nov. 1, 1932

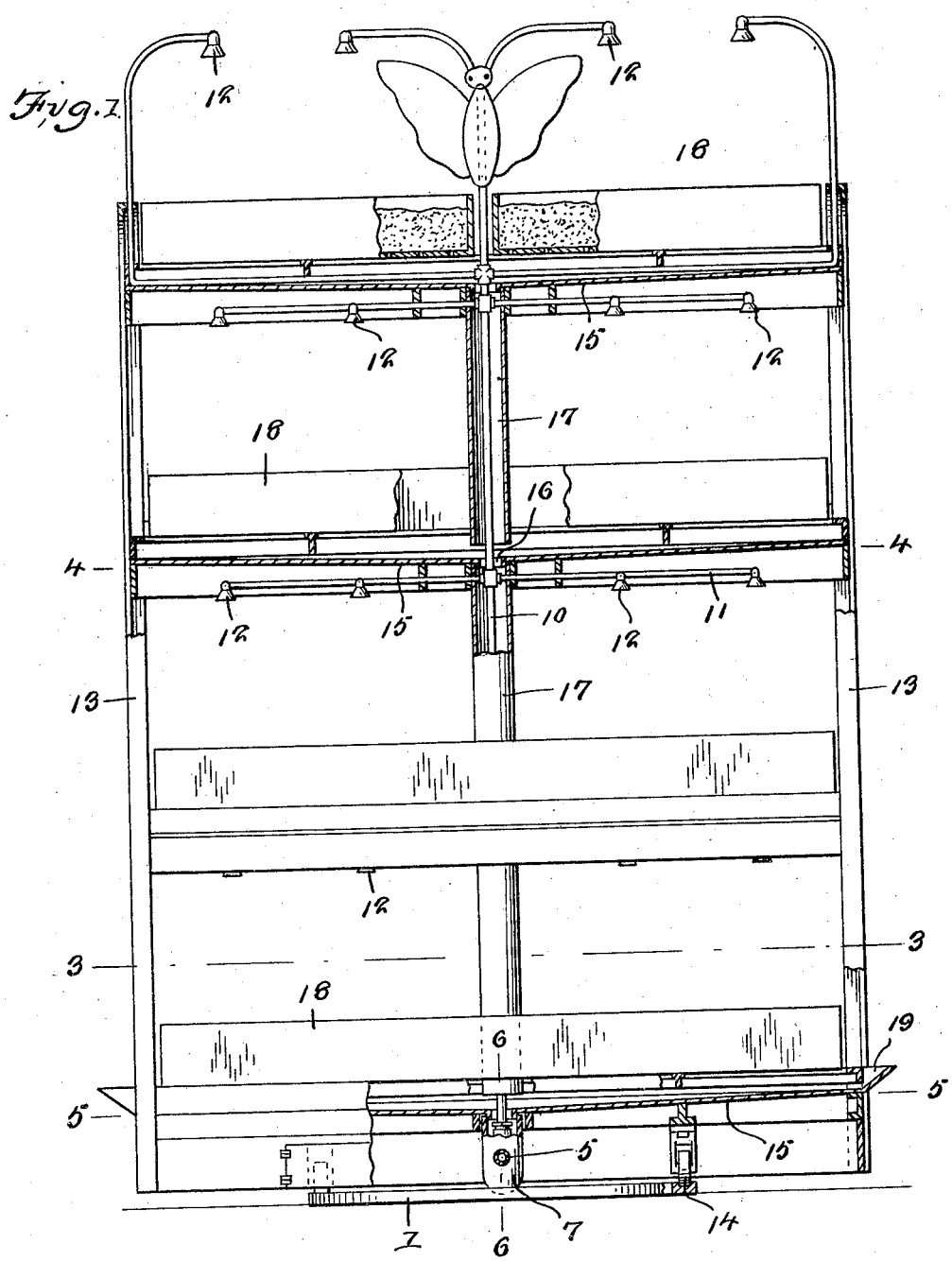

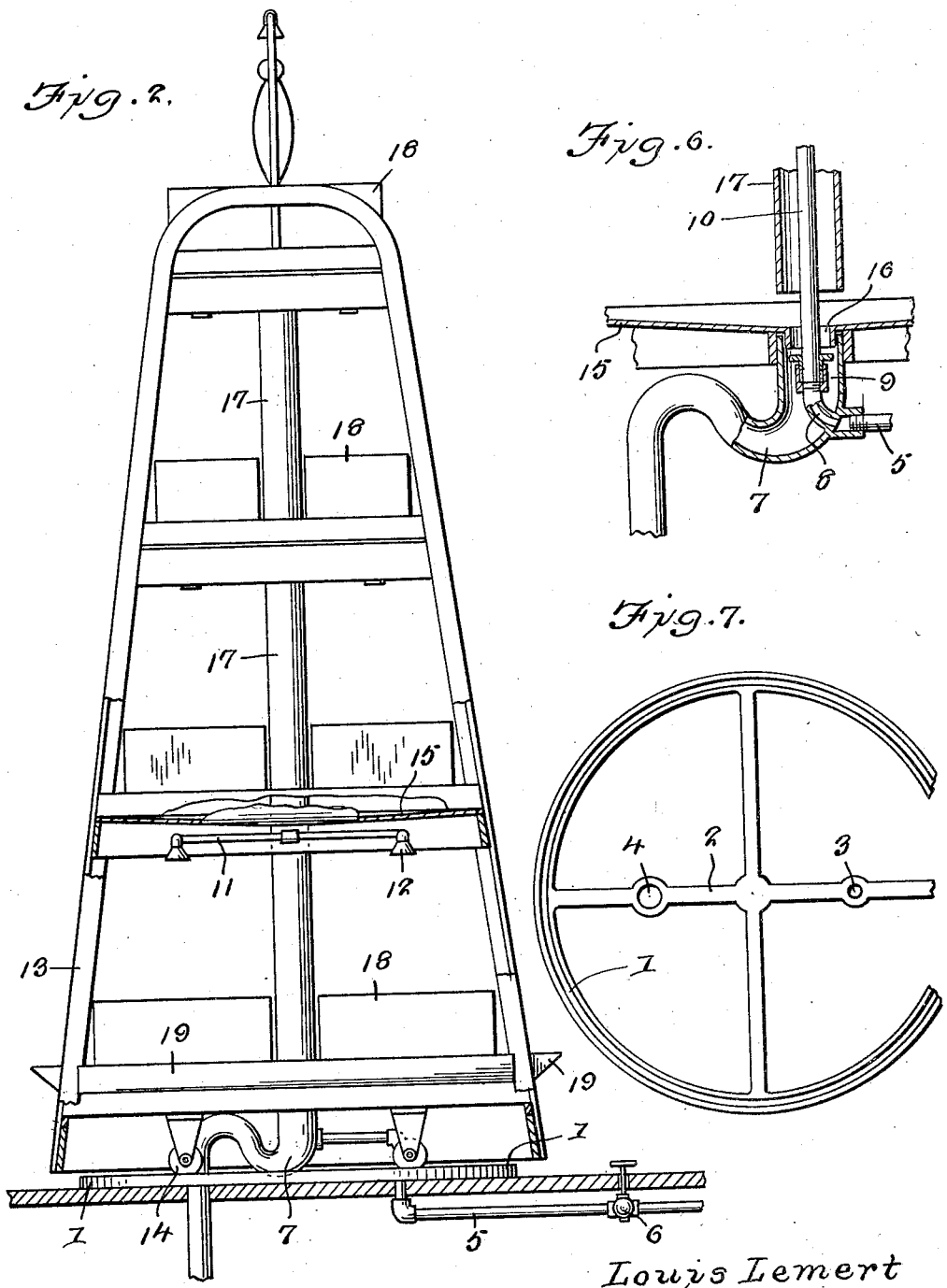

1,885,117

UNITED STATES PATENT OFFICE

LOUIS LEMERT, OF PAWNEE, OKLAHOMA

REVOLVING PLANT RACK

Application filed October 23, 1931. Serial No. 570,691.

This invention relates to revolving plant racks, especially adapted to be used for supporting and watering flowers and it consists in the novel features hereinafter described and claimed.

An object of the invention is to provide a rack of the character stated which is of simple and durable structure and consisting of a series of trays arranged under shelves in the frame of the rack in spaced parallel relation and having a drain trap communicating with the lower shelf. A watering pipe passes through the center of the trays and is adapted to rotate and sprinkling arms are connected to the water pipe and adapted to discharge sprays of water into the trays.

In the accompanying drawings:

Figure 1 is a side elevational view of the rack with parts thereof shown in section.

Figure 2 is a similar end view of the rack.

Figure 3 is a horizontal sectional view cut on the line 3—3 of Figure 1.

Figure 4 is a horizontal sectional view cut on the line 4—4 of Figure 1.

Figure 5 is a similar view cut on line 5—5 of Figure 1.

Figure 6 is a detailed sectional view cut on the line 6—6 of Figure 1.

Figure 7 is a detailed plan view of the track used in conjunction with the rack.

As illustrated in the accompanying drawings the rack consists of a circular track 1 adapted to be mounted upon a floor or other supporting surface and having cross arms 2 provided with openings 3 and 4. The water supply pipe 5 passes through the opening 3 and is provided with a valve 6 located below the floor, the valve 6 is located in close proximity to the rack and may be easily manipulated. A drain trap pipe 7 is provided with a nipple 8 which connects with pipe 5. One end of the said drain pipe 7 passes through the openings 4 of the cross arms 2. The nipple 8 is provided with a sleeve 9, and the lower end of the vertical pipe 10 is journalled in said sleeve, the pipe 10 carries internally several sets of sprinkling arms 11, each having one or more discharge nozzles 12. The frame 13 is provided with wheels 14 adapted to travel upon the track 1. The frame 13 may turn upon the track. Pans 15 are mounted upon the frame 13 and are provided with collars 16, the said collars 16 are adapted to enter the trap pipe 7 as shown in Figure 6. A pipe 17 surrounds the pipe 10 and the said pipe 17 is in sections, each section being adapted to receive the collar 16 of the pan just above. Boxes or pots 18 are mounted upon shelves immediately over the pans 15 and flowers may be planted in the said boxes or pots.

When the valve 6 is open water flows through pipe 5 and nipple 8 and enters the pipe 10. From the pipe 10 the water passes out through the arms 11 to the nozzle 12 and is sprayed upon the plants in the boxes or pots 18. The water which drains from the boxes or pots, passes down along the bottoms of the pans 15 and through the collars 16 into the pipe 17 and the trap 7. From the trap 7 the water may be passed below the surface of the floor, on to the ground or into a sewer.

The invention provides a rack of the character stated which is of simple and durable structure and consisting of a series of trays in the frame of the rack, arranged immediately under plant boxes which are supported on shelves of cross rods run across at intervals from side to side of rack frame work, all of which is in spaced parallel relation and having a drain trap communicating with the lower shelf. A watering pipe passes through the center of the trays and is adapted to rotate with the rack and sprinkling arms are connected to the water pipe and adapted to discharge sprays of water into the perforated bottomed plant boxes.

A flange 19 of several inches width extends around the rack on all sides and is in connection with bottom drain pan. Object: to catch water which might fall from overhanging foliage.

Having described the invention, what is claimed is:

1. A rack comprising a track, a wheel mounted frame located upon the track, pans mounted upon the rack and having central collars, drain pipe sections attached to the rack and receiving said collars, a watering pipe passing through the drain pipe sections and having arms attached thereto, said arms having nozzles.

2. A rack comprising a track, a wheel mounted frame located upon the track, pans mounted upon the rack and having central collars, drain pipe sections attached to the rack and receiving said collars, a watering pipe passing through the drain pipe sections and having arms attached thereto, said arms having nozzles, and a valve for controlling the water pipe.

3. A rack comprising a track, a wheel mounted frame located upon the track, box supporting shelves attached to the rack, boxes upon the shelves, drain pans mounted upon the rack and having central collars, drain pipe sections attached to the rack and receiving the collars, a watering pipe passing through the drain pipe sections and having arms attached thereto, said arms having nozzles, a valve for controlling the water, and a trap with the drain pipe.

In testimony whereof I affix my signature.

LOUIS LEMERT.